(No Model.)
H. J. AICHELE.
LATHE DOG.
No. 555,751. Patented Mar. 3, 1896.
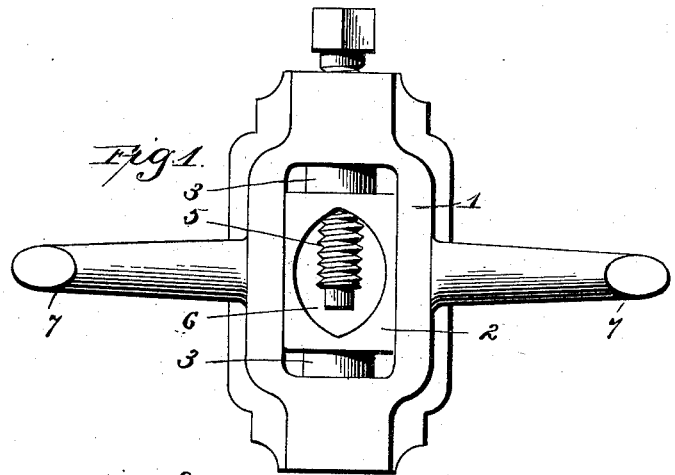
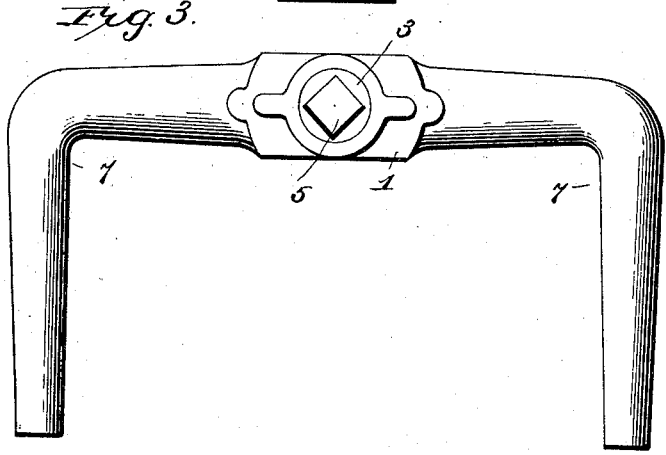
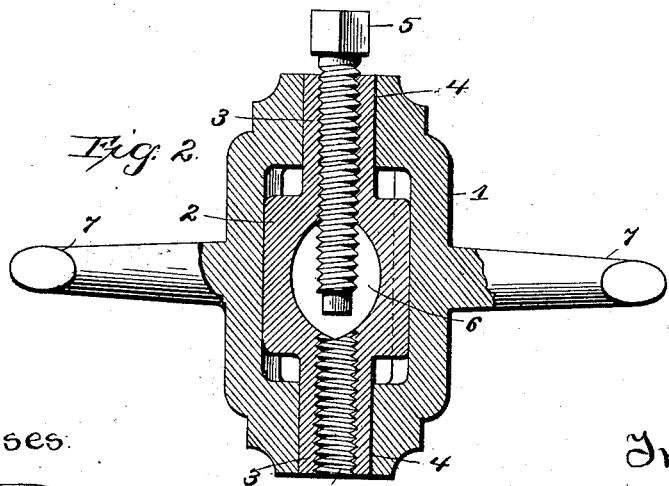
Witnesses
E. C. Wurdeman
J. Williamson
Inventor
Henry J. Aichele
by Geo. H. Holgate
Attorney

UNITED STATES PATENT OFFICE.

HENRY J. AICHELE, OF PHILADELPHIA, PENNSYLVANIA.

LATHE-DOG.

SPECIFICATION forming part of Letters Patent No. 555,751, dated March 3, 1896.

Application filed October 22, 1895. Serial No. 566,492. (No model.)

*To all whom it may concern:*

Be it known that I, HENRY J. AICHELE, a citizen of the United States, residing at Philadelphia, in the county of Philadelphia and State of Pennsylvania, have invented certain new and useful Improvements in Lathe-Dogs, of which the following is a specification.

My invention relates to a new and useful improvement in lathe-dogs, and has for its object to provide such a device that, while clamping work to the face-plate of a lathe, will bring no unequal strain upon said work, whereby the lathe-centers would be worn and imperfections in the work produced.

With these ends in view the invention consists in the details of construction and combination of elements hereinafter set forth, and then specifically designated by the claims.

In order that those skilled in the art to which my invention appertains may understand how to make and use the same, I will describe its construction and operation in detail, referring by numbers to the accompanying drawings, forming a part of this specification, and in which—

Figure 1 is an elevation of my improvement; Fig. 2, a central vertical section thereof; and Fig. 3 is a plan view.

Similar numbers denote like parts in all the views of the drawings.

1 represents the body of the dog, which is so formed as to act as a housing for the block 2, which is adapted to slide vertically therein and is guided by the reduced extensions 3, which project through the holes 4.

5 is the clamp-screw threaded through one of the extensions 3 and projecting into the hole 6, by means of which the work to be held is clamped.

7 are two tangs formed with the body of the dog and which serve to cause the dog to revolve with the face-plate of the lathe by projecting into the ordinary slots formed in said face-plate, as is well understood in connection with single-tang dogs.

In operation the work is clamped in a hole 6 by the screw 5 and then placed upon the centers of a lathe, so that the tangs shall project in the opposite slots of the face-plate; and it will be seen that as the block has a sliding movement at right angles to the position of the tangs and the tangs are free to move longitudinally in the slots of the face-plate there can come no unequal strain upon the work, as the dog will automatically adjust itself to the work, and this is of great advantage when eccentric or irregular work is being handled, since it is not essential that the dog stand upon the same center as that of the work which is being turned.

When tapering arbors are being turned, it is necessary to adjust the tail-block of the lathe to one side, and it is therefore desirable that the block 2 be capable of swinging sidewise to a corresponding extent, and this is permitted by the turning of the extensions 3 in their respective holes, the interior of the housing being curved upon a circle concentric with the holes 6 and the edges of the block made to conform thereto. By this sidewise movement in accommodating taper-work great accuracy and regularity of cut is produced, since no binding or cramping is occasioned upon the work or the centers.

In practice the use of my dog will greatly reduce the wear and tear upon a lathe, in that the strain occasioned by causing the work to turn with the live-spindle is equally distributed upon the diametrically-opposite sides of said spindle, and therefore sidewise wear caused by side thrust is obviated; and as the dog is balanced by having a tang of equal weight upon both sides the hammering which is occasioned by high speeds of the spindle when unbalanced is prevented; and as this hammering affects the cut of the tool upon the work it will also be seen that better work will be produced by the use of my improvement.

For tapping, boring, and reaming my improvement is especially advantageous, in that it produces truer threads and more cylindrical work than can possibly be produced when the strain is imparted to the tool upon one side only. My improvement is especially adapted for use in connection with cutting off work, as it prevents lifting or riding, which is so detrimental in this class of work.

In case the threads in the extension with which the screw 5 engages, or the side of the hole 6 upon which the work is clamped, should become worn, the screw 5 may be reversed and run into the threaded hole 9 in the opposite extension, as shown in Fig. 2. This will double the life of the working parts of the dog.

I am aware that slight modifications might be made in my improvement without departing from the spirit of my invention, and I therefore do not wish to be limited to the exact construction shown and described.

What I claim as new and useful is—

1. In a lathe-dog, a body having integral tangs, a block 2 slidable within the housing of the body at right angles to the tangs, said housing being curved upon a circle concentric with the hole of the block, apertured projections extending from the block which are inwardly screw-threaded, and a clamp-screw adapted to work therein.

2. In a lathe-dog, a body 1, tangs 7, projecting therefrom, a block 2, adapted to slide in one direction within said body, and provided with a central hole 6, a screw 5, for clamping the work within said hole, and extensions 3, so journaled as to permit the altering of the plane of said block relative to the faces of said body, substantially as shown and for the purposes set forth.

In testimony whereof I have hereunto affixed my signature in the presence of two subscribing witnesses.

HENRY J. AICHELE.

Witnesses:
S. S. WILLIAMSON,
WM. H. MACMUNN.